(12) United States Patent
Forzano et al.

(10) Patent No.: US 6,610,377 B1
(45) Date of Patent: Aug. 26, 2003

(54) AIRTIGHT PLASTIC SHEETING FOR COVERING PRODUCTS, PARTICULARLY ENSILED AGRICULTURAL PRODUCTS, LIKE CHOPPED SILAGE, OR SIMILAR

(75) Inventors: Bartolomeo Forzano, Mondovi (IT); Gianfranco Ferrero, Mondovi (IT)

(73) Assignee: I.B.M. Industria Plastics Monregalese S.p.A., Mondovi (IT)

( * ) Notice: Subject to any disclaimer, the term of this patent is extended or adjusted under 35 U.S.C. 154(b) by 0 days.

(21) Appl. No.: 09/555,785
(22) PCT Filed: Dec. 1, 1998
(86) PCT No.: PCT/EP98/07789
§ 371 (c)(1), (2), (4) Date: Jun. 5, 2000
(87) PCT Pub. No.: WO99/29154
PCT Pub. Date: Jun. 17, 1999

(30) Foreign Application Priority Data

Dec. 5, 1997 (IT) .................................... SV970011 U

(51) Int. Cl.⁷ .............................................. B29D 22/00
(52) U.S. Cl. ................ 428/35.7; 428/474.4; 428/476.3; 428/475.8; 435/243; 435/801
(58) Field of Search ................... 428/474.4, 476.3, 428/475.8, 35.7; 435/801, 243

(56) References Cited

U.S. PATENT DOCUMENTS 5,371,011 A  * 12/1994  Bernier ................. 435/252.4

FOREIGN PATENT DOCUMENTS

JP        002100276    * 7/1993

* cited by examiner

*Primary Examiner*—Leszek Kiliman
(74) *Attorney, Agent, or Firm*—James Creighton Wray; Meera P. Narasimham

(57) ABSTRACT

The invention relates to a single- or multilayer plastic sheeting for covering products, particularly ensiled agricultural products, or similar, like chopped silage. According to the invention, in order to prevent the fermentation of the ensiled material or to limit it to a lactic fermentation caused by anaerobic microorganisms, the cover sheeting or at least one layer of said sheet is made of an insulating plastic airtight material.

18 Claims, No Drawings

AIRTIGHT PLASTIC SHEETING FOR COVERING PRODUCTS, PARTICULARLY ENSILED AGRICULTURAL PRODUCTS, LIKE CHOPPED SILAGE, OR SIMILAR

BACKGROUND OF THE INVENTION

The present invention relates to the storage and protection of products, with particular reference to the ensilage of agricultural products, particularly chopped forage or other products for livestock.

Chopped forage or other agricultural products, particularly for livestock, are known to be ensiled at the green state in concrete pits or in stacks on the ground and compressed so as to let out as much air as possible, and then to be covered with plastic sheeting, in order to protect the ensiled material, as well as to prevent air penetration, so that harmful surface fermentation may be avoided and only the so-called low fermentation, caused by a lactic fermentation flora consisting of anaerobic microorganisms.

Nevertheless, it has been noticed that covers used until present for these ensiled products do not satisfactorily fulfil their function when they are permeable to air, and particularly to oxygen, and that they do not prevent the ensiled material from fermenting or do not limit the fermentation of this material to the effect of anaerobic microorganisms only.

SUMMARY OF THE INVENTION

The invention aims at obviating this drawback and provides, to this end, a cover, named "silo stop", for ensiled agricultural products, particularly for chopped silage, which cover consists of a single- or multilayer plastic sheet and is characterized in that at least one layer of the sheet consists of an insulating layer made of airtight, and particularly oxygen-tight plastic.

DETAILED DESCRIPTION

The plastic used for the insulating layer/s of the cover according to the invention may be formed by any type of polymers or copolymers, or mixtures thereof, wherewith a single-layer sheet, or at least one layer of a multi-layer sheet, at least substantially airtight and particularly oxygen-tight may be obtained.

According to a further characteristic of the, invention, the material used for the insulating layers of the cover for ensiled agricultural products may advantageously consist of polyamides, such as nylon, .or similar. However, other polymers may be also used, such as Ethyl Vinyl Alcohol (EVOH), Polyvinyl Alcohol (PVOH), Polyvinylidene Chloride (PVAL), EVAL, and others.

The insulating layer of the cover for ensiled products according to the invention may consist of one polymer (single-polymer layer) or of a copolymer, particularly of a mixture of at least one polyamide and one or more other polymers. Mixtures including 30% to 70% of polyamide and several combinations with other polymers insulating from air and oxygen are particularly preferred.

The "silo stop" cover for ensiled agricultural products according to the invention may only consist of the insulating layer, i.e. of one single-layer airtight plastic sheet, or may consist of two or more layers, for example coextruded layers, whereof at least one layer or possibly even more consist each of one insulating airtight plastic layer. In the case of a multi-layer sheet with at least two insulating layers, these insulating layers may be made of the same plastic material or of different plastic materials, all being airtight.

The above disclosure clearly shows that the cover for ensiled agricultural products according to the invention does not allow—thanks to its insulating layer/s—air, and therefore oxygen, to penetrate through the cover, thus preventing the fermentation of the ensiled product, or limiting it to lactic fermentation caused by anaerobic microorganisms.

Naturally, the invention is not intended to be restricted to the application examples described hereinbefore, but also comprises models achieving the same utility by using the same innovative principle, even for applications not pertaining to agriculture.

Thus for example the above disclosed sheeting may be applied for so called round bags or for so called silage bags.

What is claimed is:

1. A cover for protecting materials in a silo comprising, at least one layer of air-tight and oxygen impermeable sheeting for preventing fermentation of ensiled material and for limiting fermentation to a lactic fermentation caused by anaerobic microorganisms.

2. The cover of claim 1, wherein the at least one layer is an insulating layer made of at least one polyamide.

3. The cover of claim 1, wherein the at least one layer is an insulating layer made of mixtures of plural polymers.

4. The cover of claim 1, wherein the at least one layer is an insulating layer made of an insulating polymer selected from the group consisting of Ethyl Vinyl Alcohol (EVOH), Polyvinyl Alcohol (PVOH), Polyvinylidene Chloride (PVAL), EVAL, and combinations thereof.

5. The cover of claim 1, wherein the at least one layer is an insulating layer made of an airtight copolymer.

6. The cover of claim 1, wherein the at least one layer is an insulating layer made of a mixture of two or more polymers.

7. The cover of claim 6, wherein the at least one layer comprises a mixture of at least one polyamide and one or more other polymers.

8. The cover of claim 7, wherein the mixture comprises between about 30% and 70% polyamide.

9. The cover of claim 1, wherein the at least one layer is an insulating layer comprising a single layer sheet.

10. The cover of claim 1, wherein the at least one layer comprises a multi-layer sheet, and wherein at least one of the multi-layer sheets is an insulating layer.

11. The cover of claim 10, wherein plural layers of the multi-layer sheet are insulating layers.

12. The cover of claim 1, wherein the at least one layer insulates the material from air, oxygen, and other gases for disinfestation and for protection from parasites, insects, fungi, and other damage.

13. The cover of claim 1, wherein the at least one layer comprises an airtight plastic sheeting consisting of a single- or a multi-layer air and oxygen impermeable sheet for packaging agricultural products.

14. The cover of claim 13, wherein the at least one layer is a packaging bag.

15. The cover of claim 14, wherein the packaging bag is a round bag.

16. The cover of claim 14, wherein the packaging bag is a silage bag.

17. The cover of claim 1, wherein the material is agricultural material.

18. The cover of claim 1, wherein the material is animal fodder.

* * * * *

UNITED STATES PATENT AND TRADEMARK OFFICE
CERTIFICATE OF CORRECTION

PATENT NO. : 6,610,377 B1  
DATED : August 26, 2003  
INVENTOR(S) : Forzano et al.

It is certified that error appears in the above-identified patent and that said Letters Patent is hereby corrected as shown below:

<u>Title page,</u>
Item [73], "I.B.M. Industria Plastics Monregalese S.p.A." should read -- I.P.M. Industria Plastica Monregalese S.p.A. --.

Signed and Sealed this

Twenty-third Day of December, 2003

JAMES E. ROGAN
*Director of the United States Patent and Trademark Office*